United States Patent [19]

Chandler et al.

[11] Patent Number: 5,124,537
[45] Date of Patent: Jun. 23, 1992

[54] OMNIDIRECTIONAL BAR CODE READER USING VIRTUAL SCAN OF VIDEO RASTER SCAN MEMORY

[75] Inventors: Donald G. Chandler; Eric P. Batterman, both of Princeton, N.J.

[73] Assignee: Omniplanar, Inc., Princeton, N.J.

[21] Appl. No.: 605,098

[22] Filed: Oct. 29, 1990

[51] Int. Cl.[5] .......................... G06K 7/10; G06K 9/00; G06K 9/34
[52] U.S. Cl. .................................... 235/462; 235/470; 382/9; 382/10
[58] Field of Search .................. 382/9, 10, 48, 1; 235/454, 456, 462, 470

[56] References Cited

U.S. PATENT DOCUMENTS

| | | | |
|---|---|---|---|
| 3,801,775 | 4/1974 | Acker | 382/46 |
| 4,282,425 | 8/1981 | Chadima, Jr. et al. | 235/462 |
| 4,488,679 | 12/1984 | Bockholt et al. | 235/469 |
| 4,500,776 | 2/1985 | Laser | 235/454 |
| 4,544,064 | 10/1985 | Felder | 235/471 |
| 4,570,057 | 2/1986 | Chadima, Jr. et al. | 235/462 |
| 4,727,419 | 2/1988 | Yamada et al. | 382/8 |
| 4,766,300 | 8/1988 | Chadima, Jr. et al. | 235/462 |
| 4,776,020 | 10/1988 | Kosaka et al. | 382/10 |
| 4,822,986 | 4/1989 | Guthmueller et al. | 235/462 |
| 4,870,500 | 9/1989 | Nagashima | 382/48 |
| 4,874,936 | 10/1989 | Chandler et al. | 235/494 |
| 4,896,029 | 1/1990 | Chandler et al. | 235/494 |
| 4,903,313 | 2/1990 | Tachikawa | 382/9 |
| 4,948,955 | 8/1990 | Lee et al. | 235/462 |
| 4,958,064 | 9/1990 | Kirkpatrick | 235/384 |
| 4,988,852 | 1/1991 | Krishnan | 235/462 |
| 4,992,650 | 2/1991 | Somerville | 235/462 |

FOREIGN PATENT DOCUMENTS 0294716 12/1988 European Pat. Off. ............. 382/10
62-103773 5/1987 Japan ..................................... 382/10

*Primary Examiner*—Stuart S. Levy
*Assistant Examiner*—Edward H. Sikorski
*Attorney, Agent, or Firm*—Allan J. Jacobson

[57] ABSTRACT

An omnidirectional bar code reader uses a virtual scan of raster scan digital image memory to create the equivalent scanning pattern of a mechanical laser scanner. A two dimensional image of bar code symbol at any random orientation is captured in a memory. In one embodiment, the image memory is scanned to create a virtual scan equivalent to the scan pattern of a laser scanner. In another embodiment, the image memory is divided into plurality of memory segments, and simultaneous virtual scan is provided in each of the respective memory segments. In yet another embodiment, the memory is divided into a plurality of overlapping memory segments and simultaneous virtual scan is provided in each of the respective overlapping memory segments. The overlap between the memory segments is made large enough so that a bar code symbol of the expected size will be entirely included in one or the other of the overlapping memory segments. Thus, the boundary problem between memory segments is resolved and it is not necessary to concatenate partial scans between adjacent memory segments. The segmented scan may be achieved using an interleaved memory storage arrangement.

9 Claims, 5 Drawing Sheets

FIG. 4

OMNIDIRECTIONAL BAR CODE READER USING VIRTUAL SCAN OF VIDEO RASTER SCAN MEMORY

FIELD OF THE INVENTION

This invention relates to the field of machine readable symbols, and particularly to a method and apparatus for high speed omnidirectional reading of bar code symbols.

BACKGROUND OF THE INVENTION

Various machine readable symbols have been developed for many applications. For example, the Universal Product Code (UPC) is a bar code symbology widely used in the U.S. retail industry to identify products at the point of sale, or for inventory control purposes. In the industrial area, other bar code symbologies have been used for package identification systems. Common bar code symbologies include CODABAR, code 39, interleaved 2 of 5, and code 49. In general, machine readable codes provide significant advantages in the efficiency of material handling and data gathering.

A bar code is a particular type of machine readable symbol. A typical bar code includes parallel solid lines, or bars, of varying width and spacing. The alternating light and dark areas defined by the bars and the spaces between the bars, represent a digital code which serves to identify the content of the bar code symbol. After being read, the digital code is then directly translated to a sequence of alphanumeric characters and then by means of a data base, may be further translated to the common language description of the item bearing the subject bar code label, along with other pertinent data, such as for example the current price of the item.

A bar code may be read by scanning. Typically, a small spot of light is directed from a source of illumination to the surface of the bar code. The reflected light is sensed by a photosensitive element. The small illuminated spot of light is then swept across the bar code surface, all the while sensing the intensity of the resulting reflected light. Since light areas reflect more light than dark areas, the reflected light intensity represents the digital code which serves to identify the content of the bar code symbol.

In one type of bar code reader, a hand held laser or LED is used as the source of illumination, and the reader is manually swept across the bar code surface. In a scanning type of bar code reader, the light source is stationary while the light beam is moved in a scanning pattern. A typical scan pattern may be a linear bidirectional sweep. In the latter type of scanner, the bar code symbol and the bar code reader must still be manually oriented so that the scan pattern traverses all the bars of the bar code in order for the bar code to be properly scanned and read.

In another type of bar code scanner, a laser beam is swept through a complex series of repetitive geometric patterns in order to provide for some degree of omnidirectional scanning. Omnidirectional laser based scanners tend to be expensive due to the initial cost and limited lifetime of the laser light source. Also, a laser having an intense concentrated light source can be an eye hazard, and requires special precautions in manufacturing and handling.

Also important, a laser scanner requires a complex mechanism to sweep the laser beam in a predetermined pattern. The resulting scanning mechanism includes complex optical elements such as rapidly rotating polygonal mirrors. Components must be able to withstand both mechanical wear, as well as maintain optical properties under difficult conditions, as may be encountered in industrial environments. Thus, mechanical laser scanners tend to be expensive due to the cost of precision optical and mechanical scanning mechanisms.

Furthermore, as faster scanning speeds are required, the problems associated with mechanical scanners become more acute. For example, at very high scanning speeds, mechanism wear may be excessive. More important, as scanning speed is increased, laser power must be increased in order to maintain the same illumination energy density. Also, complex scanning patterns add to the complexity of the scanning mechanism. In many situations involving high scanning speeds and/or complex scanning patterns, mechanical scanning may be impractical or impossible.

SUMMARY OF THE INVENTION

The present invention is embodied in an omnidirectional bar code reader using a virtual scan of a video raster scan memory to create the equivalent scanning pattern of a mechanical or laser scanner.

A bar code reader in accordance with the present invention includes means for capturing and storing a two dimensional image in memory storage, which stored image may include a bar code symbol somewhere within the field of view, and processing said stored two dimensional image in an onmidirectional manner in order to read out information contained in said stored two dimensional image of said bar code symbol. Specifically, the processing means includes means for scanning through said stored two dimensional image in memory storage in a pattern corresponding to a desired scanning pattern, and detector coupled to said scanning means for decoding said bar code symbol.

In accordance with another embodiment of the present invention, a bar code reader includes means for capturing and storing a two dimensional image in memory storage, which memory storage includes a plurality of memory segments. For each of the plurality of memory segments, processing means are included for simultaneously scanning through said memory segments in a pattern corresponding to a desired scanning pattern, and plurality of detector means coupled to said plurality of scanning means respectively, for decoding said bar code symbol. The use of a plurality of memory segments provides for higher scanning speeds since each of the memory segments are scanned simultaneously. For a bar code situated at the boundary between memory segments, partial scans taken from the two adjacent memory segments are concatenated to form a complete scan.

In accordance with yet another embodiment of the present invention, a bar code reader includes means for capturing and storing a two dimensional image in memory storage, which memory storage includes a plurality of overlapping memory segments. For each of the overlapping memory segments, scanning means are included for scanning through said overlapping memory segments in a pattern corresponding to a desired scanning pattern, and detector means coupled to said scanning means for decoding said bar code symbol.

The use of overlapping memory segments resolves the boundary problem between memory segments. That is, because of the overlap between memory segments, a bar code situated partially within one memory segment will be included in the adjacent memory segment. Thus, there is no need to concatenate partial scans between adjacent segments.

Use of virtual scan of a video raster scan memory, in accordance with the present invention, avoids the need for mechanical scanners. The output of the virtual scanner can be decoded by the same processor used for scan pattern generation, or may be connected to the input of a conventional detector/decoder which normally follows a laser scanner output, thus replacing the laser scanner and the associated optical and mechanical components.

Virtual scan of a video raster scan memory in accordance with the present invention will not wear out like a mechanical scanner, is more economical, can be easily electrically reprogrammed to a different scan pattern, and is capable of much higher scanning speeds than a mechanical scanner.

DESCRIPTION OF THE DRAWINGS

FIG. 4 is a memory map of an alternate embodiment of the organization of the digital image memory shown in FIG. 2 embodying the present invention.

DETAILED DESCRIPTION

The operation of "scanning a bar code", as used in the prior art, relates to sweeping an illuminated spot across a bar code. As used herein, with respect to the present invention, the operation of "scanning a bar code" relates to extracting from image memory storage, sequential values derived from said image memory storage corresponding to reflectivities along a sweep traversing the bar code.

Figure 1:
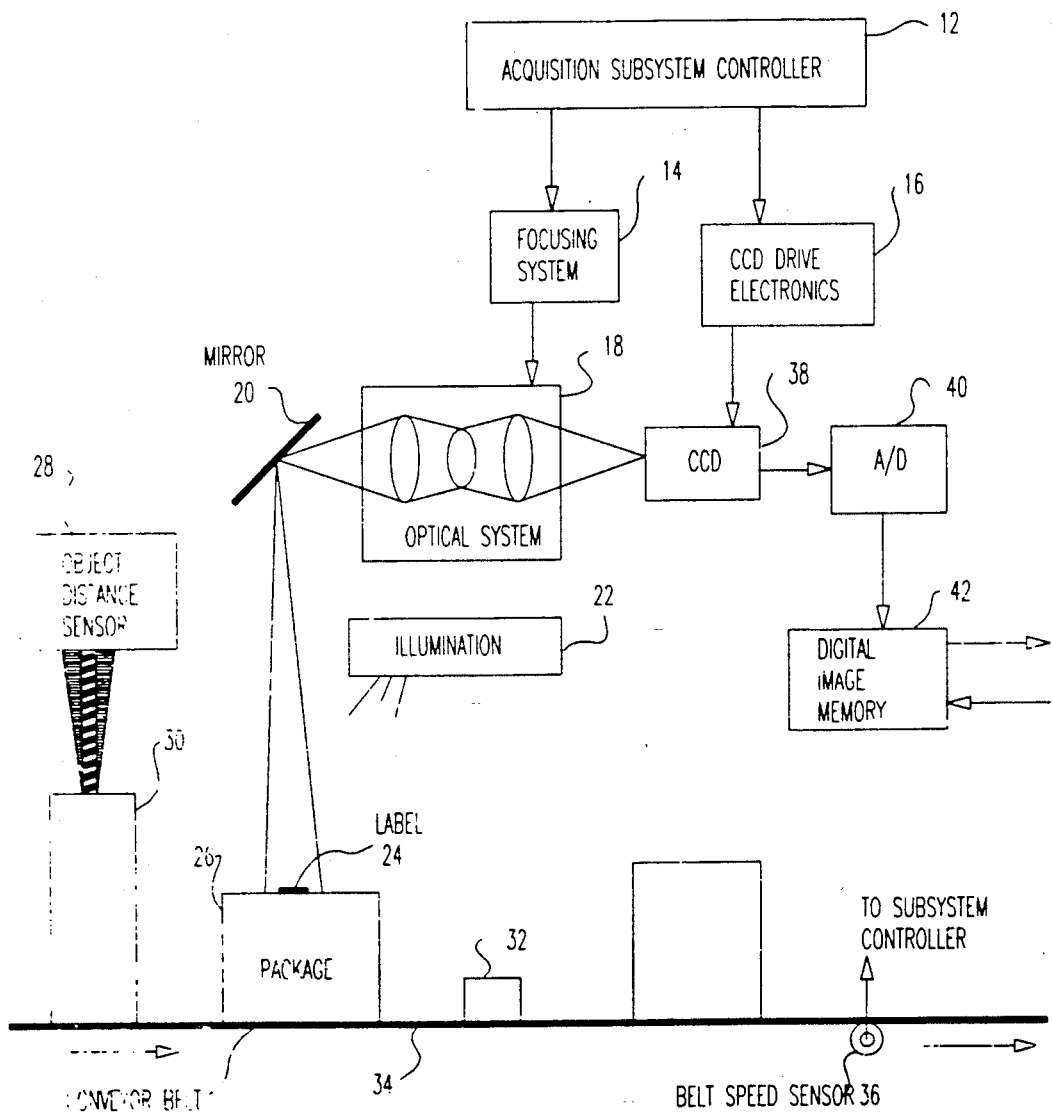
FIG. 1 is a schematic diagram partially in block form, of a conveyor belt image acquisition subsystem which may be used in conjunction with the present invention.

An image acquisition subsystem 10 is shown in FIG. 1. Packages 30, 32, and 26 are transported by a conveyor belt 34, past a read station where an image of label 24 is captured for storage in digital image memory 42.

The image acquisition subsystem comprises illumination source 22, and an optional object distance sensor 28 coupled to the acquisition subsystem controller 12. Acquisition subsystem controller 12 is coupled to an optional focusing system 14 which controls optical system 18 to focus one line of an image of label 24 via mirror 20 on one line CCD 38. Fixed focus optics may be used if all labels are expected to lie within the depth of field of the fixed focus system. CCD drive electronics 16 controls CCD 38 to read out one line of analog video information to analog to digital converter 40, which output is then stored in digital image memory 42.

In operation, packages 30, 32 and 26 are carried by conveyor belt 34 under the optional object distance sensor 28 which measures the height of the top surface of the package 30 from the surface converter belt 34. Package height information is communicated to the acquisition subsystem controller 12, which through focusing system 14, CCD drive electronics 16, optical system 18, and mirror 20, focuses one raster scan line of a video image of label 24 onto the CCD 38. Belt speed sensor 36 provides belt speed information to the acquisition subsystem controller 12. In such manner, successive raster scan lines of a two dimensional image of label 24 are acquired in the one line charge coupled device CCD 38, and stored in digital image memory 42. Thus, as conveyor belt 34 transports packages, successive raster scan lines are stored in digital image memory 42, thereby capturing a two-dimensional image containing an image of a bar code symbol from label 24.

Figure 2:
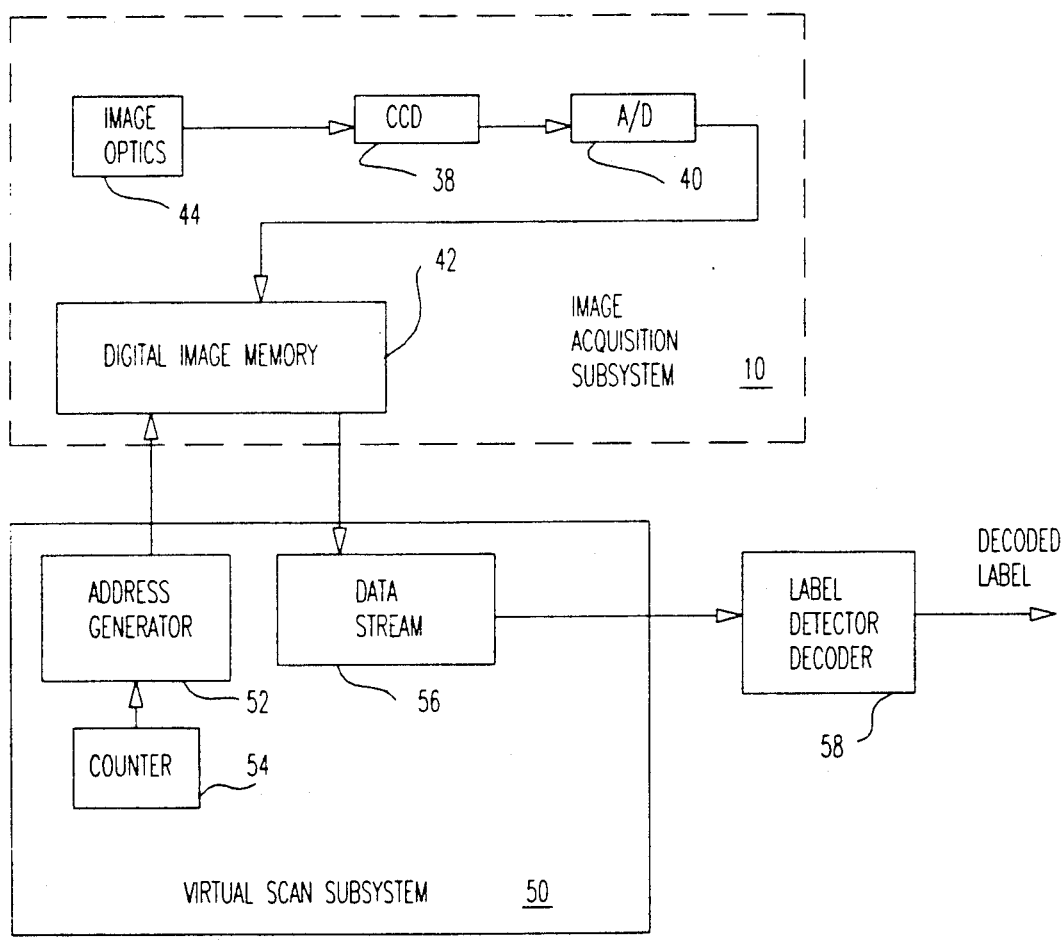
FIG. 2 is a block diagram of an omnidirectional bar code reader in accordance with the present invention.

In FIG. 2 the image acquisition subsystem 10 comprises image optics 44, which through CCD 38 and A/D 40, acquires a two dimensional image in digital memory 42. Thereafter, a virtual scan subsystem 50 processes the stored image to provide an output scan to label detector decoder 58. The virtual scan subsystem 50 includes an address generator 52 driven by a counter 54, and a data stream buffer 56.

In operation, counter 54 drives address generator 52 to generate a succession of addresses which is used to access corresponding locations in digital image memory 42. The output of digital image memory 42 to data stream buffer 56 represents a desired virtual scan pattern through the stored two dimensional image. Data stream buffer 56 conditions the sequence of digital output values from digital image memory 42 to be a suitable output, either analog or digital, to be similar to the output of a mechanical/optical scanner, if necessary.

The output of data stream buffer 56 is connected to a conventional label detector decoder 58 well-known to those skilled in the art, which provides a decoded label output. In such manner, image acquisition subsystem 10 and virtual scan subsystem 50 replace a laser scanner. The virtual scan pattern may be easily changed by changing the programming of address generator 52, which may be implemented in a programmable read only memory (PROM)s. Alternatively, virtual scan address sequences and corresponding memory access may be generated by a general purpose microprocessor and memory.

Figure 3:
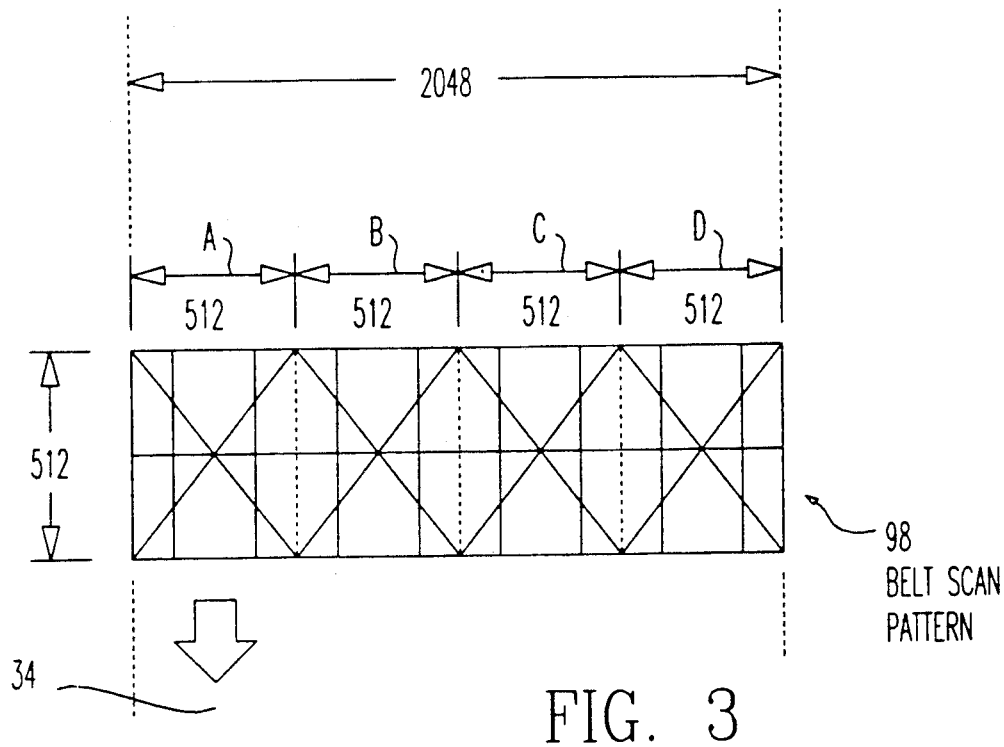
FIG. 3 is an illustration of a scan pattern which may be used in a belt reader in conjunction with the present invention.

A typical virtual scan pattern, which may be used in a belt scanner is shown in FIG. 3. Conveyor belt 34 moves downward in the diagram of FIG. 3. The width of the belt is shown as 2,048 pixels. The height of the stored two dimensional image is indicated at 512 pixels. The belt scan pattern 98 is a series of one horizontal, eight vertical, and eight diagonal lines crisscrossing the stored two dimensional image. That is, stored data representing image pixels in digital image memory 42 is successively accessed in the pattern shown to reproduce the effect of a laser scanner. The scan pattern through the memory may be repeated as each sucessive, most recent line of video information is added to the memory (and the least recent line of video information is dropped). In other implementations, the scan pattern may be repeated after a number of sucessive lines of video information are added to the memory. Parameters such as belt speed and width, maximum bar code length, optical resolution, video line rate, image buffer size, virtual scan pattern and virtual scan rate are factors to be balanced for optimum operation. For example, scanning speed may be increased to compensate for a desired increase in belt speed. In general, it should also be understood that the captured image may contain a bar code image which is less than a complete bar code, in which case the decoder should be able to concatenate the respective partial scans through the successive captured bar code images to form a scan through the complete bar code.

In accordance with an alternate embodiment of the present invention, which provides for greater virtual scanning speed, digital image memory 42 is segmented into multiple segments. Each of the multiple segments is separately and simultaneously scanned, thus providing a speed improvement factor equal to the number of segments.

At the top of FIG. 3, four segments A, B, C, and D are indicated as a portion of the digital image memory and belt scan pattern 98. Each of the segments A, B, C, and D are simultaneously scanned using the corresponding portion of the total belt scan pattern 98.

Figure 4:
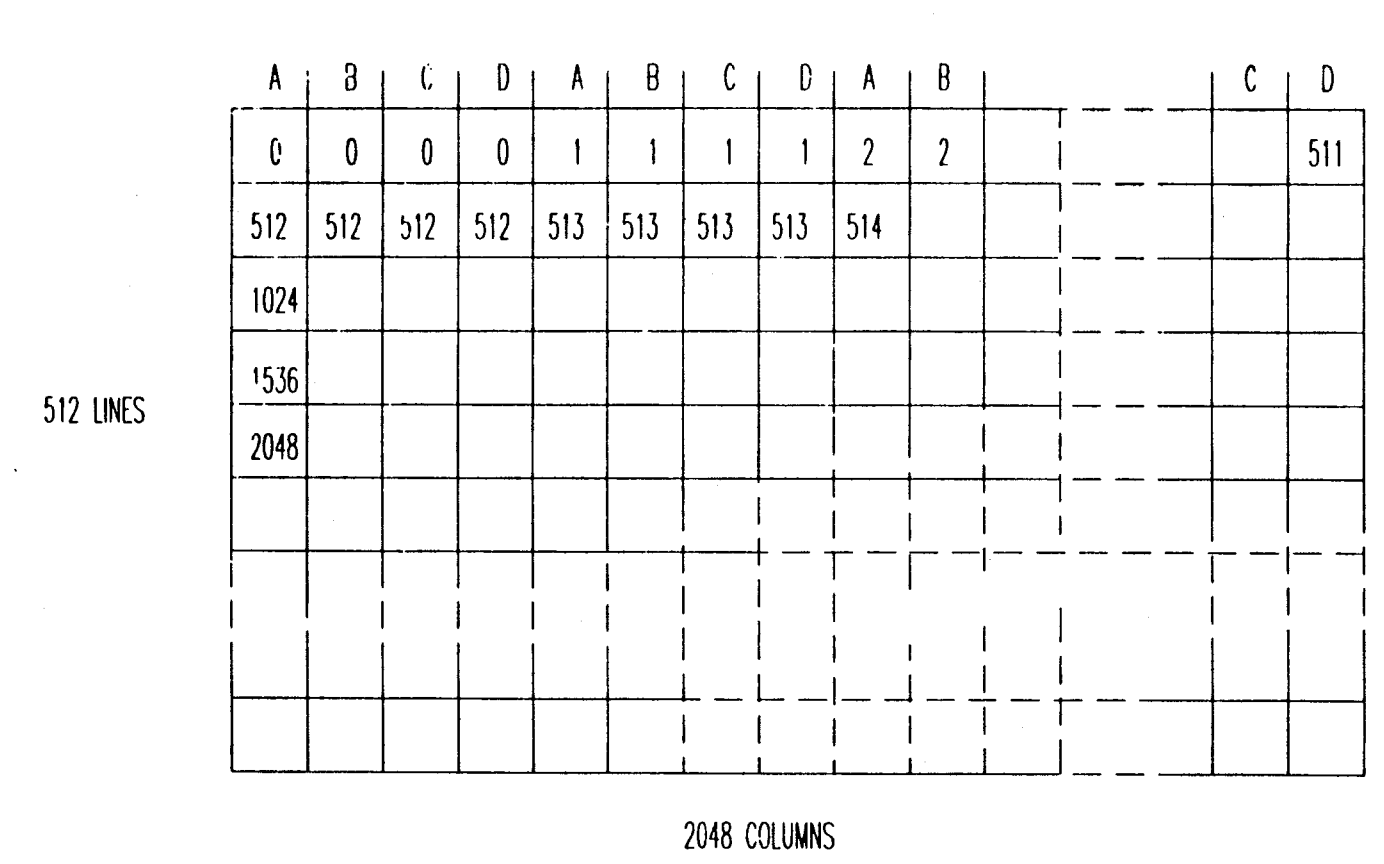

Segmented scan as indicated in FIG. 3, may be achieved using an interleaved memory storage arrangement of 512 lines, each containing 2048 pixels, as illustrated in the memory map of FIG. 4. Each pixel may, for example, be represented by four bits.

Specifically, the 1st pixel of the 1st row of each of the four memory segments A, B, C, and D is stored at adjacent memory locations (shown in FIG. 4 as four adjacent, zero entries), and accessed simultaneously. Similarly, the 2nd pixel of each of the four memory segments A, B, C, and D is stored at the next four adjacent memory locations (shown in FIG. 4 as four adjacent, one entries), and also accessed simultaneously. The next four sequential entries correspond to the 3rd pixel of each of the four memory segments, and so on until the 511th. The following line of the memory map begins with four entries of pixel number 1024 corresponding to the 1st pixel of the 2nd row of each of the memory segments A, B, C, and D, respectively, and so on until 512 lines of 2048 pixels each are stored in the digital image memory.

The interleaved memory as shown in the memory map of FIG. 4 permits four pixels, one from each of the corresponding segments A, B, C, and D to be simultaneously accessed with one memory access. Thus, a sequence of addresses corresponding to a desired scan pattern applied to the memory organized as in FIG. 4, will produce four separate and simultaneous scans of the four segments A, B, C, and D. A bar code symbol lying within any of the segments A, B, C, or D will thus be decoded by the respective memory scan within the corresponding memory segment. In the event that a bar code symbol lies across the boundary between two adjacent segments, each segment scan will produce a partial read of the bar code, and it would then be necessary to concatenate the respective partial scans.

Figure 6:
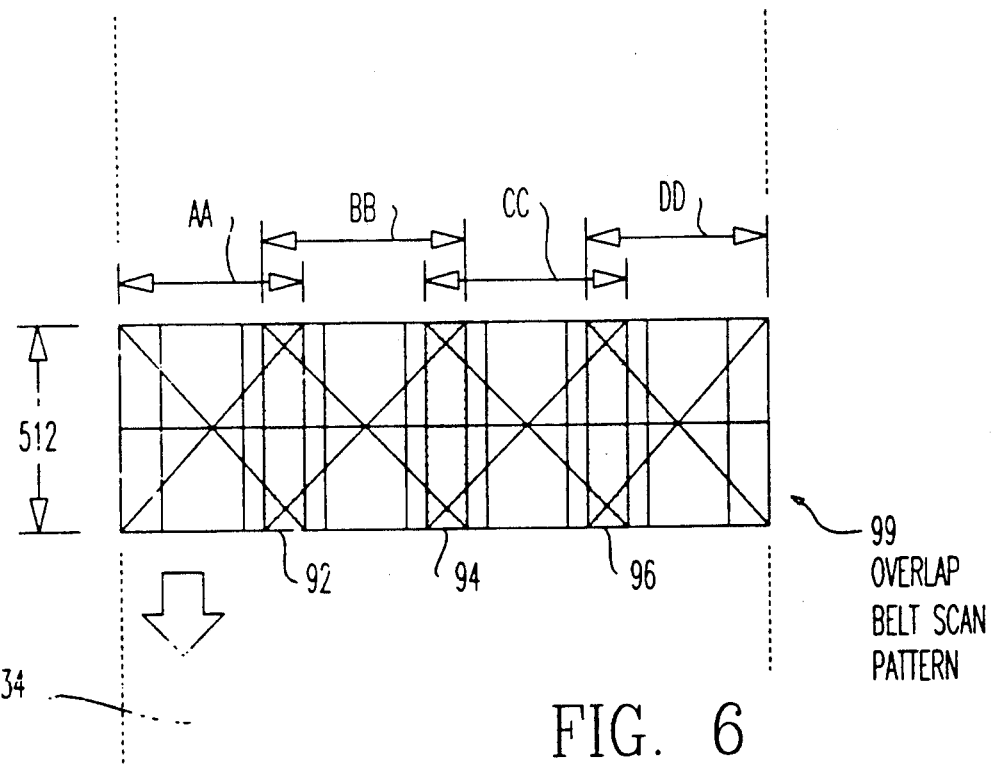
FIG. 6 is an illustration of an alternate embodiment of an overlapping scan pattern which may be used in a belt reader in conjunction with the present invention.

An alternate embodiment of the present invention using an overlapping scan pattern 99 which may be used to avoid the need to concatenate the respective partial scans, is shown in FIG. 6. As before, the interleaved memory is divided into four segments which may be simultaneously accessed with one memory access, and conveyor belt 34 moves downward in the diagram of FIG. 6. However the individual segments AA, BB, CC, and DD are generally larger than segments A, B, C, and D respectively in order to create overlapping image storage areas 92, 94, and 96, respectively.

Instead of having any given pixel stored in only one memory segment, data storage in memory segments AA, BB, CC, and DD is made sufficiently overlapping so that a bar code symbol lying across the boundary of one memory segment will be included in the adjacent memory segment. For the latter purpose, the width of each of the overlapping areas 92, 94, and 96 is made wider than the longest expected bar code label. Thus, the boundary problem between segments is resolved and it is not necessary to concatenate partial scans between adjacent segments.

Figure 5:
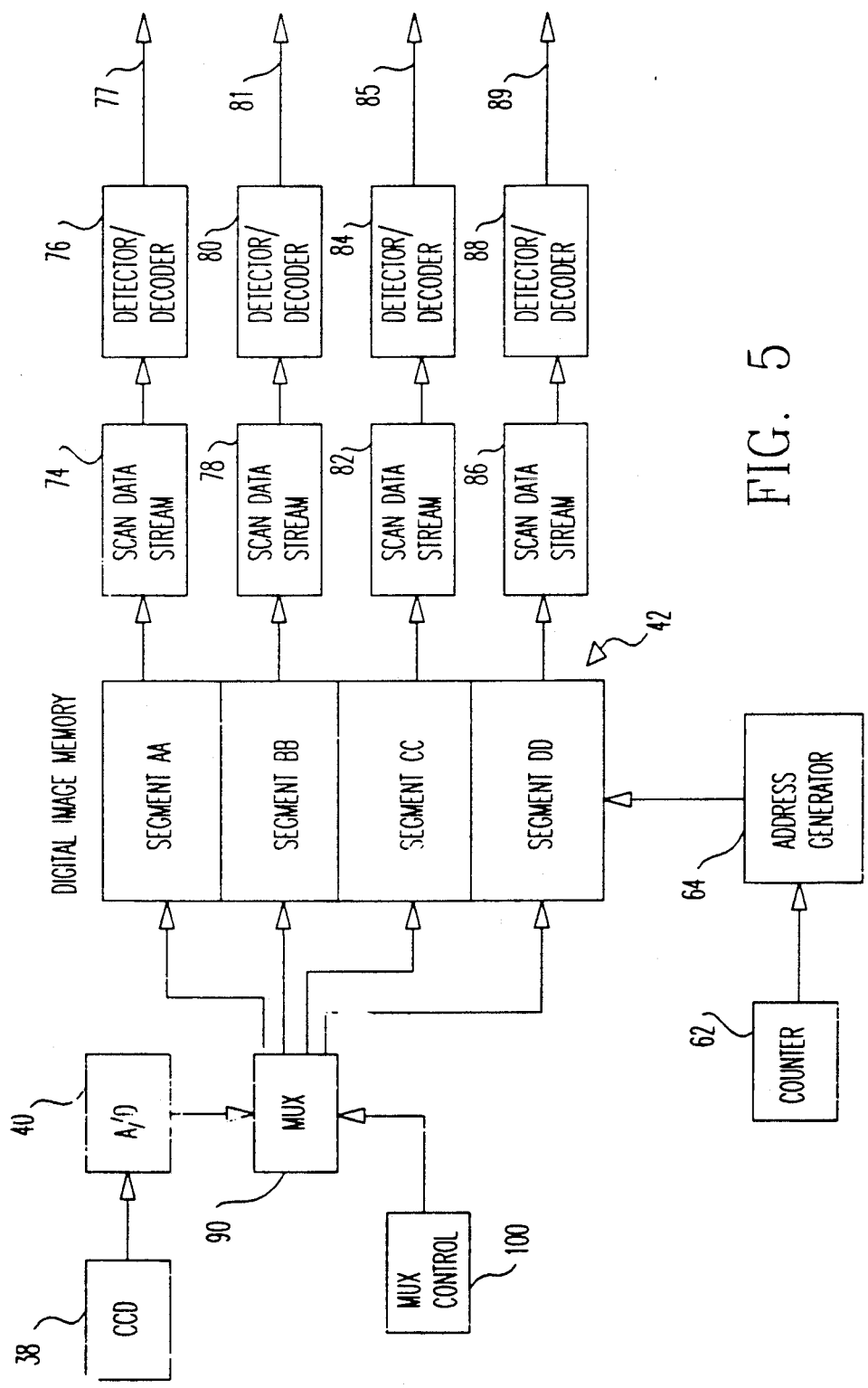
FIG. 5 is a block diagram of yet another alternate enbodiment of an omnidirectional bar code reader in accordance with the present invention.

A block diagram of bar code reader is illustrated in FIG. 5. Specifically, digital image memory 42 consists of memory segment AA which is coupled to scan data stream buffer 74 which is coupled to detector decoder 76 to provide an output on terminal 77. Memory segment BB is coupled to scan data stream buffer 78 which is coupled to detector decoder 80 to provide an output on terminal 81. Similarly, memory segment CC is coupled to scan data stream buffer 82 which is coupled to detector decoder 84 to provide an output on terminal 85, and memory segment DD is coupled to scan data stream buffer 86 which is coupled to detector decoder 88 to provide an output on terminal 89.

The data input to segments AA, BB, CC, and DD is provided through multiplexer 90. Multiplexer 90 is coupled to receive input data from analog to digital converter 40 which receives raster scan analog image input from CCD 38. An overlap between memory segments AA, BB, CC, and DD is created by coupling multiplexer 90 to more than one memory segment at a time under the control or multiplexer control 100. Multiplexer 100 may be programmed to provide any desirable memory segment overlap, or no overlap at all.

Counter 62 coupled to address generator 64 provides the desired scan pattern for memory segments AA, BB, CC, and DD as before. It is understood that many of the individual block diagram elements of FIG. 5 may be realized by programming a general purpose microprocessor and memory.

In operation, each successive raster scan video line in CCD 38 is converted to successive digital values by analog to digital converter 40. Multiplexer 90 selects which of the memory segments AA, BB, CC, and DD is to receive any given pixel for storage. Although the memory segments are either independently addressable or interleaved (as shown in FIG. 4) to provide four simultaneous pixel value outputs at one time, input pixel values are stored one at a time in one or more memory segments as each pixel value is received from analog to digital converter 40.

Thereafter, counter 62 and address generator 64 create simultaneous virtual scan patterns in each of the overlapping memory segments. The four virtual scan patterns are decoded by a separate conventional bar code detector decoder as before.

The overlap between the memory segments is made large enough to that a bar code of the expected size will be entirely included in one or the other of the overlapping memory segments. As a result, one of the decoded outputs on terminals 77, 81, 85, and 89 will contain a proper scan of the bar code image without the need to concatenate partial scans between adjacent memory segments.

What is claimed is:

1. An apparatus for reading a bar code symbol, said apparatus comprising:
   a memory;
   means for capturing a two dimensional image;
   means for storing said captured two dimensional image in said memory, said stored two dimensional image containing an image of a bar code symbol anywhere within the field of view of said stored two dimensional image;

means for partitioning said memory into a plurality of memory segments;

means for simultaneously scanning in each of said plurality of memory segments of said memory through said stored two dimensional image in a virtual scan pattern corresponding to a desired scanning pattern to provide a plurality of virtual scanning pattern outputs;

means coupled to said plurality of virtual scanning pattern outputs for simultaneously processing said stored two dimensional image in each of said plurality of memory segments in order to read out information contained in said stored two dimensional image of said bar code symbol;

wherein said means for partitioning said memory into a plurality of memory segments comprises means for interleaving said memory so that a single memory access at one address corresponds a plurality of image pixels respectively corresponding to more than one of said plurality of memory segments.

2. An apparatus in accordance with claim 1, further comprising:

a counter; and address generator means responsive to said counter and coupled to said interleaved memory for generating a sequence of memory address corresponding to said desired scanning pattern to provide [a]said plurality of virtual scanning pattern outputs.

3. An apparatus in accordance with claim 1, wherein said means for partitioning said memory into a plurality of memory segments including said means for interleaving said memory further comprises:

means for partitioning said memory into a plurality of separate independent memories respectively corresponding to said plurality of memory segments so that a single memory access at one address of each of said plurality of separate independent memories corresponds to a plurality of image pixels in said respective plurality of memory segments.

4. An apparatus in accordance with claim 3, further comprising:

a counter; and address generator means responsive to said counter and coupled to said plurality of separate independent memories for generating a sequence of memory address corresponding to said desired scanning pattern to provide a plurality of virtual scanning pattern outputs.

5. An apparatus in accordance with claim 1, further comprising:

means for simultaneously decoding said plurality of scanning pattern outputs in order to decode information contained in said stored two dimensional image of said bar code symbol.

6. An apparatus in accordance with claim 1, further comprising:

means for simultaneously decoding said plurality of scanning pattern outputs wherein at least one of said plurality of memory segments contains a complete store two dimensional image of a bar code symbol in order to decode information contained in said stored two dimensional image of said bar code symbol.

7. An apparatus in accordance with claim 1, further comprising:

means for overlapping at least two of said memory segments so that a bar code situated partially within one of said overlapping memory segments will be included in the other adjacent overlapping memory segment.

8. A method in accordance with claim 7, further comprising:

means for simultaneously processing said stored two dimensional image in an omnidirectional manner in each of said plurality of memory segments wherein at least one of said plurality of memory segments contains a complete stored two dimensional image of a bar code symbol, in order to read out information contained in said stored two dimensional image of said bar code symbol.

9. An apparatus in accordance with claim 7, wherein said means for overlapping at least two of said memory segments so that a bar code situated partially within one of said overlapping memory segment will be included in the other adjacent overlapping memory segment, comprises:

means for providing a sequence of pixel values representing successive pixel values along a raster scan a multiplexer coupled to said means for providing a sequence of pixel values, for storing individual ones of said sequence of pixel values in more than one of said memory segments.

* * * * *